US010368473B2

(12) United States Patent
Treinen et al.

(10) Patent No.: US 10,368,473 B2
(45) Date of Patent: *Aug. 6, 2019

(54) TREAD WIDTH CONNECTIONS

(71) Applicant: CNH Industrial America LLC, New Holland, PA (US)

(72) Inventors: Kerry J. Treinen, Malone, WI (US); Blaine A. Schwalbe, Valders, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/815,079

(22) Filed: Nov. 16, 2017

(65) Prior Publication Data

US 2019/0141877 A1     May 16, 2019

(51) Int. Cl.
| | |
|---|---|
| *A01M 7/00* | (2006.01) |
| *B60P 3/30* | (2006.01) |
| *A01B 63/00* | (2006.01) |
| *A01B 63/16* | (2006.01) |
| *A01B 63/22* | (2006.01) |

(52) U.S. Cl.
CPC ............ *A01B 63/16* (2013.01); *A01B 63/006* (2013.01); *A01B 63/22* (2013.01); *A01M 7/0082* (2013.01); *B60P 3/30* (2013.01)

(58) Field of Classification Search
CPC ..... A01B 63/006; A01B 63/16; A01B 63/163; A01B 63/166; A01B 63/22; B60B 35/10; B60B 35/1036; B60B 35/1072; B60B 35/109; B60B 2900/1212; A01M 7/0082; B60P 3/30; A01C 23/008; B62D 49/0678; B60Y 2200/224

See application file for complete search history.

(56) References Cited

U.S. PATENT DOCUMENTS

| | | | |
|---|---|---|---|
| 3,964,565 | A | 6/1976 | Cagle et al. |
| 4,350,222 | A | 9/1982 | Lutteke et al. |
| 4,619,340 | A | 10/1986 | Elmer et al. |
| 5,039,129 | A | 8/1991 | Balmer |
| 5,083,630 | A | 1/1992 | Zaun |
| 5,464,243 | A * | 11/1995 | Maiwald ............. B60B 35/1018 180/906 |

(Continued)

FOREIGN PATENT DOCUMENTS

WO     2015040337     3/2015

*Primary Examiner* — Darren W Gorman
(74) *Attorney, Agent, or Firm* — Rebecca L. Henkel; Rickard K. DeMille (57) ABSTRACT

An agricultural machine such as a high clearance sprayer is provided with a frame capable of supporting wheels at a variable tread width. The frame includes a first cross member and a second cross member, both of which have slider receivers formed in an outer edge of either side of the frame. The machine also includes a first axle slider for a first side and a second axle slider for a second side. Each axle slider includes a pair of axle slider legs configured to be telescopically inserted into and out of the respective slider receiver, as well as a main slider body extending between the pair of axle slider legs. The axle sliders are configured to support a pair of wheels on either side of the frame. Additionally, actuators are mounted within the cross members that enable the telescopic movement of the axle sliders relative to the cross members.

20 Claims, 8 Drawing Sheets

(56) References Cited

U.S. PATENT DOCUMENTS

| | | | |
|---|---|---|---|
| 6,386,554 B1 | 5/2002 | Weddle | |
| 6,406,043 B1 * | 6/2002 | Balmer | B60B 35/003 |
| | | | 180/403 |
| 6,454,294 B1 | 9/2002 | Bittner et al. | |
| 7,044,251 B2 | 5/2006 | Mast | |
| 7,163,227 B1 | 1/2007 | Burns | |
| 8,376,078 B2 | 2/2013 | Hiddema | |
| 9,180,747 B2 * | 11/2015 | Slawson | B60G 3/01 |
| 9,241,450 B2 | 1/2016 | Mangen | |
| 2011/0148053 A1 * | 6/2011 | Motebennur | B60G 9/00 |
| | | | 280/6.16 |
| 2014/0041962 A1 | 2/2014 | Borghi | |
| 2015/0034736 A1 | 2/2015 | Jones et al. | |
| 2015/0102586 A1 | 4/2015 | Tollefsrud et al. | |

\* cited by examiner

TREAD WIDTH CONNECTIONS

FIELD OF THE INVENTION

The invention relates generally to agricultural product application equipment or agricultural machines such as self-propelled sprayers and, in particular, to adjustable tread width systems of sprayers with slider legs that telescopically slide into and out of cross-members of a frame, where the actuators and cylinders that adjust the width of the slider legs are routed inside the frame.

BACKGROUND OF THE INVENTION

Many high-clearance sprayers have adjustable tread widths that have tread width connections with axle sliders for movably mounting swingarms and axle-supporting legs to chassis frames. The movable mounting of the tread widths connectors provide leg widening capabilities of the sprayer for adjusting tread width. Traditionally, the actuators such as hydraulic cylinders that facilitate such movement of the legs are mounted outside of frame rails that interconnect lobes on the axle sliders and frame for moving the axle sliders in and out of slider receivers of the frame to adjust tread width when using the leg widening feature. Each of the lobes has to be fit against and welded to the respective axle slider or frame component and the pushing and pulling of the lobes outside of the axle sliders and slider receivers can urge the axle sliders to shift inside the slider receivers and cause bending moments, which can increase the wear rate of slider wear pads between the axle sliders and slider receivers.

SUMMARY OF THE INVENTION

A high clearance sprayer with an adjustable tread width with a frame, a first axle slider, a second axle slider and a plurality of actuators. The frame may include a first side, a second side, a first cross member extending from the first side to the second side to form a first slider receiver on the first side and a second slide receiver on the second side. Additionally, the frame may include a second cross member extending from the first side to the second side to form a third slider receiver on the first side and a fourth slider receiver on the second side. The first cross member and the second cross member may be substantially hollow. Further, a first opening may be formed in a front wall of the first cross member, a second opening may be formed in a rear wall of the first cross member, a third opening may be formed in a front wall of the second cross member, and a fourth opening may be formed in a rear wall of the second cross member.

According to an aspect of the present invention, the first axle slider may include a first axle slider leg configured to be telescopically inserted into the first slider receiver, a second axle slider leg configured to be telescopically inserted into the third slider receiver, and a main slider body that extends parallel to the first side of the frame from the first axle slider leg to the second axle slider leg. Additionally, the first axle slider may include a pair of swingarms that extend from a front and rear segment of the main slider body, as well as a pair of wheels that may be rotatably supported by the pair of swingarms.

According to another aspect of the present invention, the second axle slider may include a third axle slider leg configured to be telescopically inserted into the second slider receiver, a fourth axle slider leg configured to be telescopically inserted into the fourth slider receiver, and a main slider body that extends parallel to the second side of the frame from the third axle slider leg to the fourth axle slider leg. The second axle slider may also include a pair of swingarms that extend from a front and rear segment of the main slider body, as well as a pair of wheels that may be rotatably supported by the pair of swingarms.

According to yet another aspect of the present invention, the plurality of actuators may be secured to the frame and to the first axle slider leg, the second axle slider leg, the third axle slider leg, and the fourth axle slider leg. For instance, the plurality of actuators may be mounted to an interior of the first axle slider leg, the second axle slider leg, the third axle slider leg, and the fourth axle slider leg. Similarly, the plurality of actuators may be mounted on a first end within the first cross member and the second cross member and mounted on a second end within the first axle slider leg, the second axle slider leg, the third axle slider leg, and the fourth axle slider leg. Additionally, each frame cross member may house a left actuator for actuating the left axle slider and a right actuator for actuating the right axle slider. The plurality of actuators may telescopically move the first tread width connector and the second tread width connector into and out of the first cross member and the second cross member to adjust the width of the tread. The plurality of actuators may extend or retract the same distance once actuated. Additionally, the plurality of actuators may be arranged concentrically inside of each of the slider receivers.

According to another aspect of the present invention, a first mounting plate may be mounted to the front wall of the first cross member to cover the first opening, and a second mounting plate may be mounted to the rear wall of the first cross member to cover the second opening. In this way, a pair of mounting plates sandwich an intermediate portion of the respective frame cross member therebetween. A plurality of pins may extend through the first mounting plate, the second mounting plate, and a plurality of mounting openings formed in the actuators. Similarly, a third mounting plate may be mounted to the front wall of the second cross member to cover the third opening, and a fourth mounting plate may be mounted to the rear wall of the second cross member to cover the fourth opening. A plurality of pins may also extend through the third mounting plate, the fourth mounting plate, and a plurality of mounting openings formed in the actuators. Additionally, each of the mounting plates may also have a collar that extends therefrom that helps to locate the mounting plate relative to the relevant opening. The mounting plates may also define a mounted position and an unmounted position. In the mounted position, the mounting plate is connected to the respective frame cross member to cover the opening in the frame cross member and to prevent access to the actuators within the frame cross member. In the unmounted position, the mounting plate is removed from the respective frame cross member so that the opening in the frame cross member is uncovered to allow access to the actuators within the frame cross member.

According to yet another aspect of the present invention, the high clearance sprayer with adjustable tread width may include a chassis having a frame, a pair of slider receivers, a left axle slider and a right axle slider, actuators, and a tread width connection assembly. For instance, the frame may have left and right rails at left and right sides of the frame and a pair of frame cross members that extend between the left and right frame side rails. A pair of left slider receivers may be defined by left segments of the cross members. Each of the left slider receivers may have an outer end with an opening that connects to a slider passage that extends longitudinally through the respective slider receiver. Also, a pair of right slider receivers may be defined by right segments of the cross members. Each of the right slider receivers may have an outer end with an opening that connects to a slider passage that extends longitudinally through the respective slider receiver.

According to another aspect of the present invention, the left axle slider is configured to support a pair of left wheels. The left axle receiver also includes a main slider body that extends parallel to the left frame rail, as well as a pair of slider legs that extend from first and second ends of the main slider body toward the frame. These slider legs may be telescopically housed in the pair of left slider receivers. Similarly, the right axle slider is configured to support a pair of right wheels. The right axle receiver also includes a main slider body that extends parallel to the right frame rail, as well as a pair of slider legs that extend from first and second ends of the main slider body toward the frame. These slider legs may be telescopically housed in the pair of right slider receivers.

Again, the actuators may be arranged within the left and right slider receivers for pushing and pulling the slider legs within the respective slider receivers to telescopically adjust the tread width of the high clearance sprayer. Additionally, the tread width connection assemblies may be configured to connect the actuators to the frame. Each of the tread width connection assemblies include at least one mounting plate removably covering an opening in each of the frame cross member between the respective left and right slider receivers. These mounting plates define a mounted position and an unmounted position. In the mounted position, the mounting plate is connected to the respective frame cross member and covers the opening in the frame cross member to prevent access to the actuators within the frame cross member. In the unmounted position, the mounting plate is removed from the respective frame cross member so that the opening in the frame cross member is uncovered and allows access to the actuators within the frame cross member. Additionally, a pair of pins may extend through the cross member and mount inner ends of the respective actuators within the cross member. In this case, the ends of the pins are connected to the mounting plate when the mounting plate is in the mounted position.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
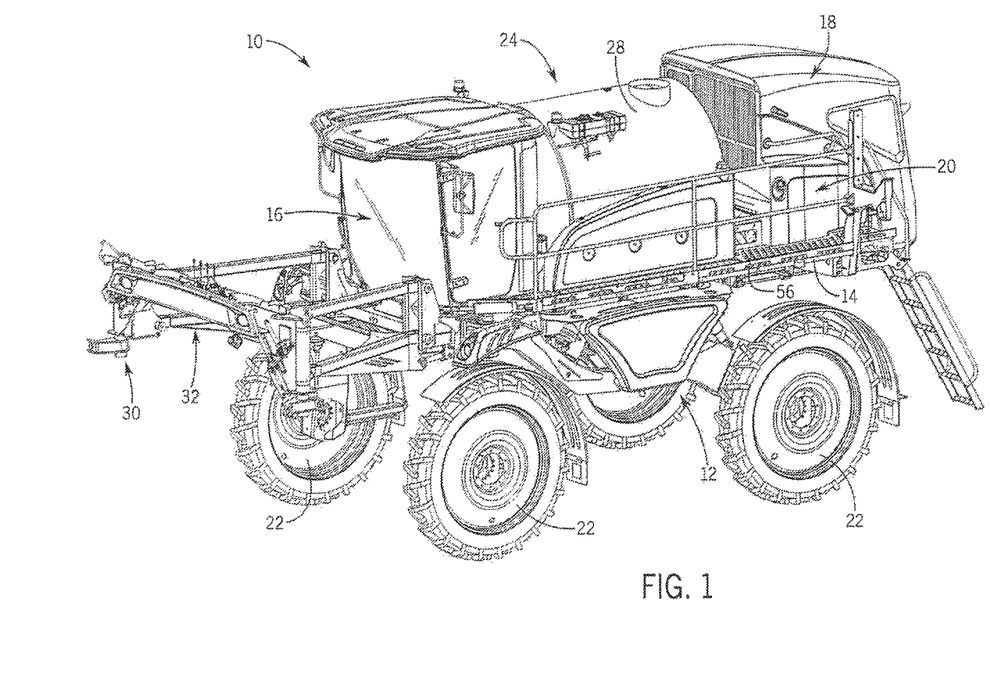
FIG. 1 is an isometric view of an agricultural machine.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and New Holland Guardian Series sprayers.

Still referring to FIG. 1, the sprayer 10 includes a chassis 12 having a chassis frame 14 that supports various assemblies, systems, and components. These various assemblies, systems, and components can include an operator cab 16, an engine 18 and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings.

A spray system 24 can include storage containers such as a rinse tank 26 for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is configured to move the boom 30 up and down for adjusting the height of application of the product.

The chassis frame 14 and various other components associated with the chassis frame 14 that facilitate tread width adjustments or that allow for shipping of various components associated with the sprayer 10 will be described in greater detail. The chassis frame 14, as most clearly shown in FIG. 2-4 includes a first side 50, a second side 52, a front end 54, a back end 56, and a central portion 58. The first side 50 includes a first frame side-rail 60 within the central portion 58 and the second side 52 includes a second frame side-rail 62 within the central portion 58. Each the frame side-rails 60, 62 are generally tubular in shape with a top wall 64, a bottom wall 66, a first side wall 68, and a second side wall 70.

Figure 2:
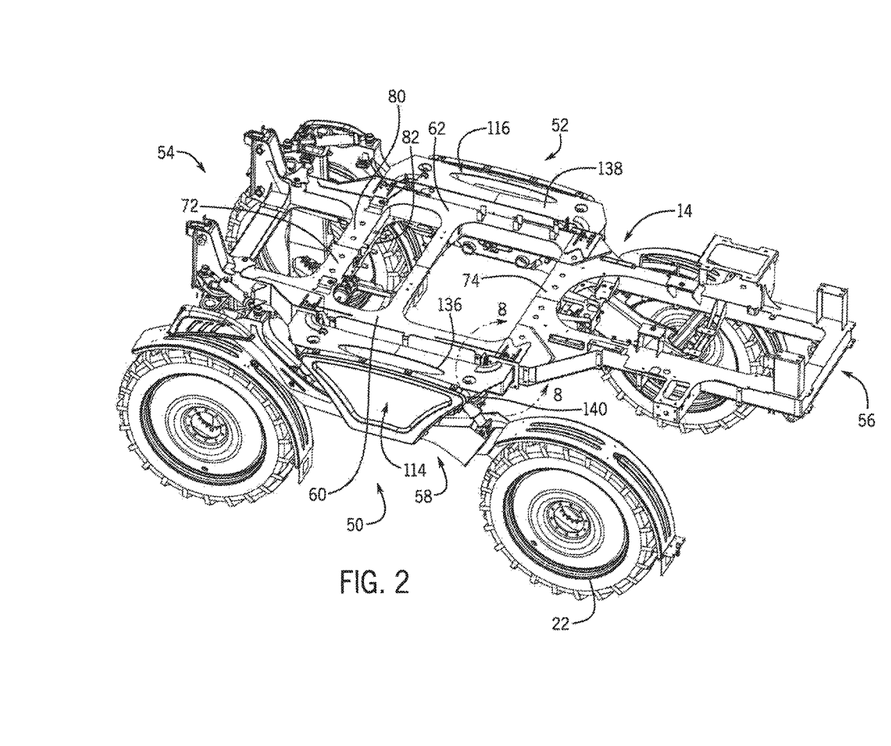
FIG. 2 is an isometric view of a chassis frame of the agricultural machine of FIG. 1.
Figure 3:
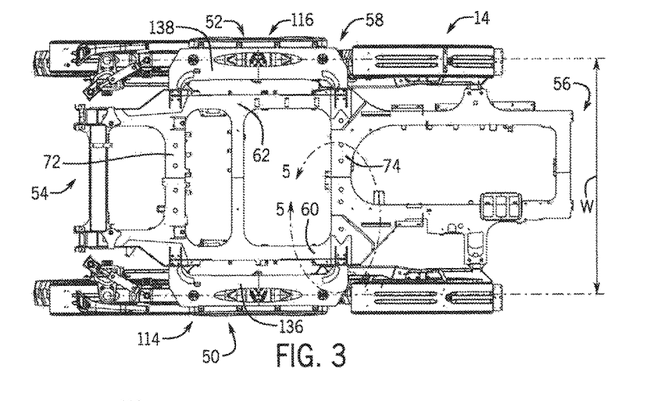
FIG. 3 is a top plan view of the frame of the agricultural machine of FIG. 1 in a first position with a first tread width wherein a first axle slider and a second axle slider are located directly adjacent to the chassis frame.
Figure 4:
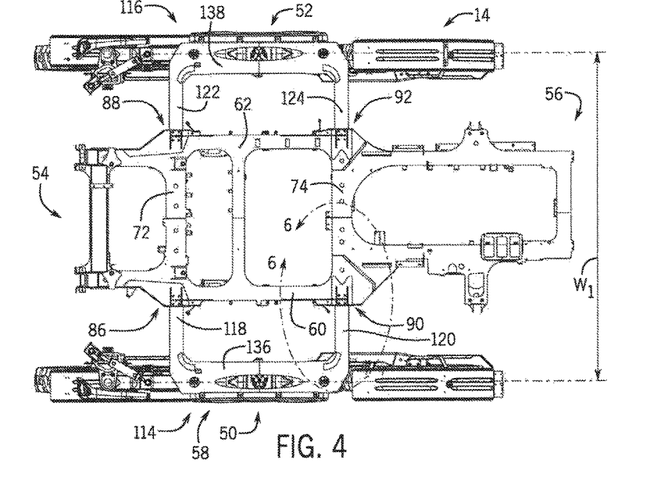
FIG. 4 is a top plan view of the frame of the agricultural machine of FIG. 1 in a second position with a second tread width wherein the first axle slider and the second axle slider are spaced apart from the chassis frame.

Additionally, the chassis frame 14 includes a first cross member 72 that extends from the first side-rail 60 to the second side-rail 62 at the front of the central portion 58 and a second cross member 74 that extends from the first side-rail 60 to the second side-rail 62 at the rear of the central portion 58. Each of the cross members 72, 74 have a generally tubular body defined by interconnected slider receiver walls with inwardly-facing surfaces, for instance, front and rear walls 76, 78 respectively, and top and bottom walls 80, 82 respectively. As such, the cross members 72, 74 are substantially hollow, which allows various components to be routed within each cross member 72, 74 and for components to slide into and out of each cross member 72, 74.

Figure 11:
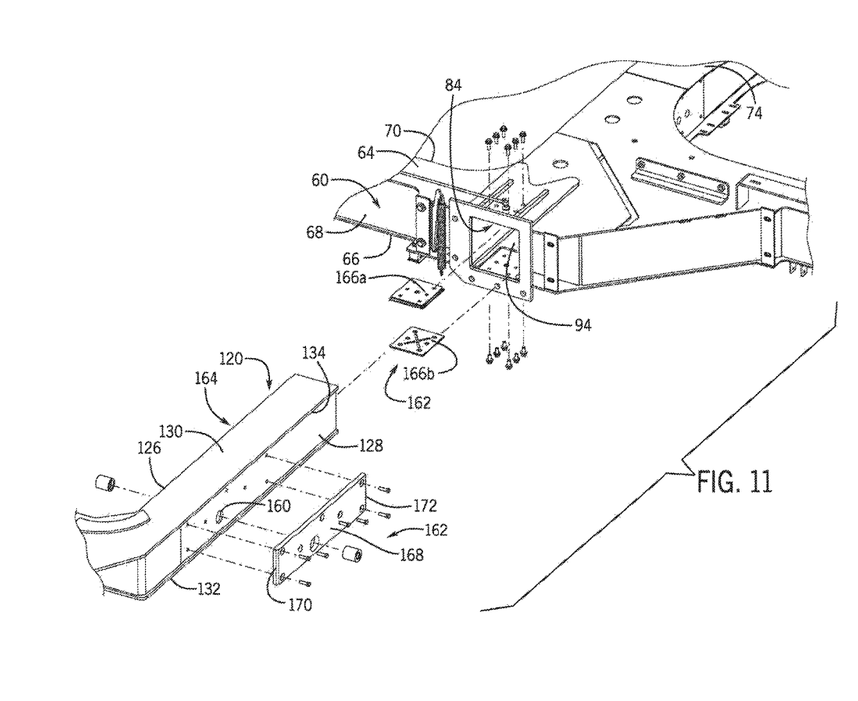
FIG. 11 is an exploded isometric view of the first axle slider and the frame.

The cross members 72, 74 may also have openings 84 located at outer ends of either frame side-rail 60, 62 that form slider receivers 86, 88, 90, 92. While only one opening 84 is shown in FIG. 11, it should be understood that similar openings are formed in each of the outer ends of the frame side-rails 60, 62 adjacent to the cross members 72, 74. As shown, a first slider receiver 86 may be located at the first frame side-rail 60 and a second slider receiver 88 may be located at the second frame side-rail 62 of the first cross member 72. A third frame slider receiver 90 may similarly be located at the first frame side-rail 60 and a fourth frame slider receiver 92 may be located at the second frame side-rail 62 of the second cross member 74. As such, the first slider receiver 86 and the third slider receiver 90 may constitute a pair of left slider receivers and the second slider receiver 88 and the fourth slider receiver 92 may constitute a pair of right slider receivers. The cross members 72, 74 may also form slider passages 94 directly adjacent to the slide receivers 86, 88, 90, 92 in both the first cross member 72 and the second cross member 74. These frame slider receivers 86, 88, 90, 92 and slider passages 94 are configured to accommodate slider legs, which will be further described below.

Figure 7:
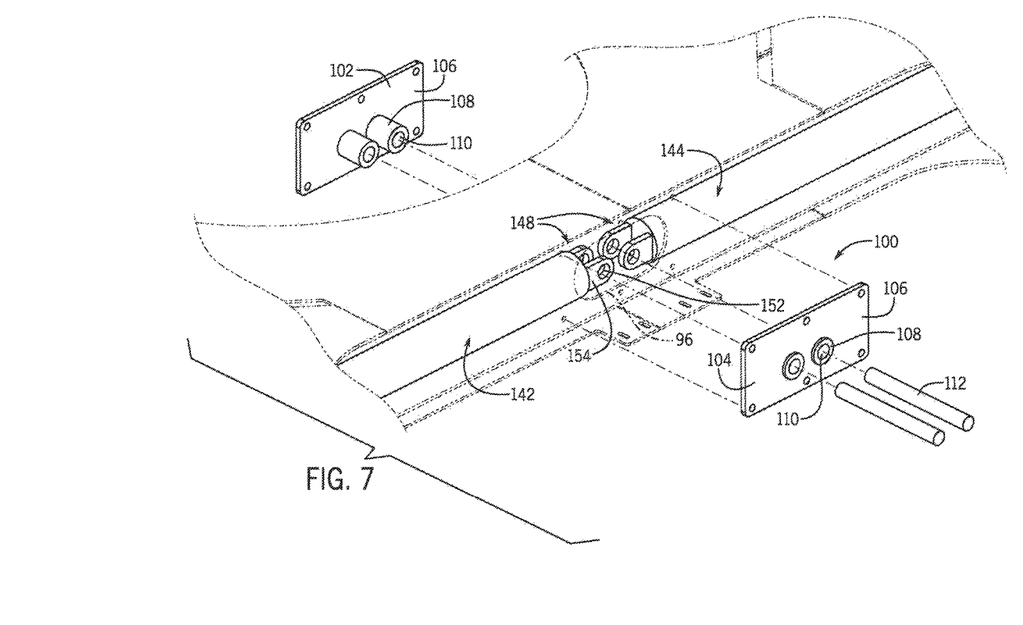
FIG. 7 is an exploded isometric view of the cross member and two mounting plates used to secure a pair of actuators to the chassis frame.
Figure 8:
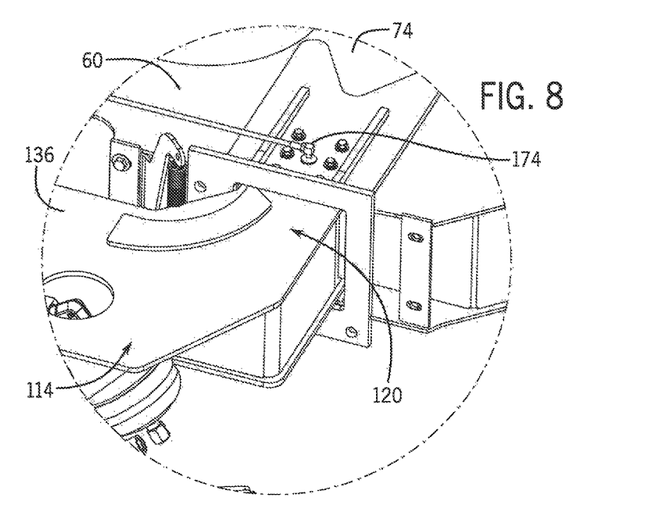
FIG. 8 is detailed isometric view of an axle slider and a portion of the chassis frame in the first position of FIGS. 3 and 5, taken generally along line 8-8 of FIG. 2.

Further, the cross members 72, 74 may feature openings 96 formed in the front and rear walls 76, 78 to facilitate access to the interior of the cross members 72, 74. While only a first opening 96 is shown in FIG. 7, a second opening, a third opening, and a fourth opening are similarly formed in the cross members 72, 74 as described below. For instance, the first opening 96 may be formed in the front wall 76 of the first cross member 72 and the second opening may be formed in a rear wall 78 of the first cross member 72. Similarly, the third opening may be formed in the front wall 76 of the second cross member 74 and the fourth opening may be formed in the rear wall 78 of the second cross member 74. These openings 96 enable maintenance procedures on parts that may be routed through the cross members 72, 74. Preferably, these openings 96 are formed along the longitudinal axis of the sprayer 10. This is especially helpful because many of the components routed through the cross members 72, 74 are mounted to the center of the agricultural machine 10.

When the sprayer 10 is in use, however, a tread width connection assembly 100 may be used to close up the openings 96 to protect the contents housed within the cross member 72, 74. For instance, the tread width connection assembly 100 may include four mounting plates that correspond with the four openings 96 formed in the front and the rear walls 76, 78 of the cross member 72, 74. Still looking to FIG. 7, while the mounting plates 102, 104 are only shown with the second cross member 74, identical mounting plates are similarly mounted to the first cross member 72. More specifically, a first mounting plate may be mounted to the front wall 76 of the first cross member 72 to cover the first opening and a second mounting plate may be mounted to the rear wall 78 of the first cross member 72 to cover the second opening. Similarly, a third mounting plate 102 may be mounted to the front wall 76 of the second cross member 74 to cover the third opening and a fourth mounting plate 104 may be mounted to the rear wall 78 of the second cross member 74 to cover the fourth opening 96.

Each of the mounting plates 102, 104 include a generally flat body 106 with at least one collar 108 extending outwardly therefrom with an opening 110 formed therein. As shown in FIG. 7, each of the mounting plates 102, 104 have two circular collars 108, where each of the two circular collars 108 coincide with one of two actuators described below that are routed through the cross members 72, 74. Each collar 108 is configured to be inserted into the openings 96 formed in the cross members 72, 74. In this way, the collars 108 help to locate the mounting plates 102, 104 relative to the opening 96 formed in the cross members 72, 74 to ensure a secure fit. The mounting plates 102, 104 are secured to the chassis frame 14 using bolts, screws, or other fasteners that are inserted through the mounting plates 102, 104 and into the front wall 76 and rear wall 78. Additionally, at least one pin 112 and as shown two pins may be inserted through the openings 110 in the mounting plates 102, 104 as well as the respective cross member 72, 74. The pins 112 may also be configured to extend through components located within the respective cross member, as will further be described below. Additionally, these collars 108 provide added surface area to improve the structural connection between the mounting plates 102, 104, the cross members 72, 74, and the components located within the cross members 72, 74.

The mounting plates 102, 104 therefore define a mounted position and an unmounted position. In the mounted position, the mounting plates 102, 104 are connected to the respective frame cross member 72, 74. This allows the openings 96 to be covered to prevent access to components mounted within the cross members, such as actuators that will further be described below, as well as any other components that may be mounted within the cross members 72, 74. In the unmounted position, the mounting plates 102, 104 are removed from the respective frame cross member 72, 74. This allows the interior of the frame cross members 72, 74 to be uncovered, which allows for access to the components routed within the cross members 72, 74. Such access allows for maintenance of components within the cross members 72, 74.

Next, axle slider assemblies 114, 116 will be further described, which extend outwardly and beyond the first side 50 and the second side 52 of the chassis frame 14, and are movable relative to the chassis frame 14 and support the sprayer 10 wheels 22. The sprayer 10 includes two axle slider assemblies, with a first axle slider 114 being movably adjusted relative to the first side 50 and a second axle slider 116 being movably adjusted relative to the second side 52. Preferably, the axle sliders 114, 116 will both move the same distance once actuated, such that the chassis frame 14 is always centered relative to the two axle sliders 114, 116.

Each of the axle sliders 114, 116 include axle slider legs, a main slider body, and a pair of swing arms. More specifically, the first axle slider 114 includes a first axle slider leg 118 that may be telescopically inserted into the first slider receiver 86. The first axle slider 114 also includes a second axle slider leg 120 that may be telescopically inserted into the third slider receiver 90. Similarly, the second axle slider 116 includes a third axle slider leg 122 that may be telescopically inserted into the second slider receiver 88. The second axle slider 116 also includes a fourth axle slider leg 124 that may be telescopically inserted into the fourth slider receiver 92. Each of the slider legs 118, 120, 122, 124 have interconnected slider leg walls having outwardly-facing surfaces, including front and rear walls 126, 128 respectively, and top and bottom walls 130, 132 respectively. While these walls are only shown in FIG. 11 with respect to the second axle slider leg 120, it should be noted that the remaining legs 118, 122, 124 have similar walls. Additionally, the front and/or rear wall 126, 128 may be slightly offset from outer edges of the top and bottom walls 130, 132, as best seen in FIG. 11. In this way, a lip 134 may be formed where the edges of the top and bottom walls 130, 132 extend beyond the front and/or rear wall 126, 128.

Additionally, the first axle slider 114 includes a main slider body 136 that extends parallel to the first side 50 of the chassis frame 14 from the first axle slider leg 118 to the second axle slider leg 120. Correspondingly, the second axle slider 116 includes a main slider body 138 that extends parallel to the second side 52 of the chassis frame 14 from the third axle slider leg 122 to the second axle slider leg 124. In this way, the second axle slider 116 is the inverse of the first axle slider 114. Further still, pairs of swingarms 140 extend from a front and rear segment of both main slider bodies 136, 138. Finally, a pair of wheels 22 are rotatably supported by each of the pair of swing arms 140.

Figures 5, 6:
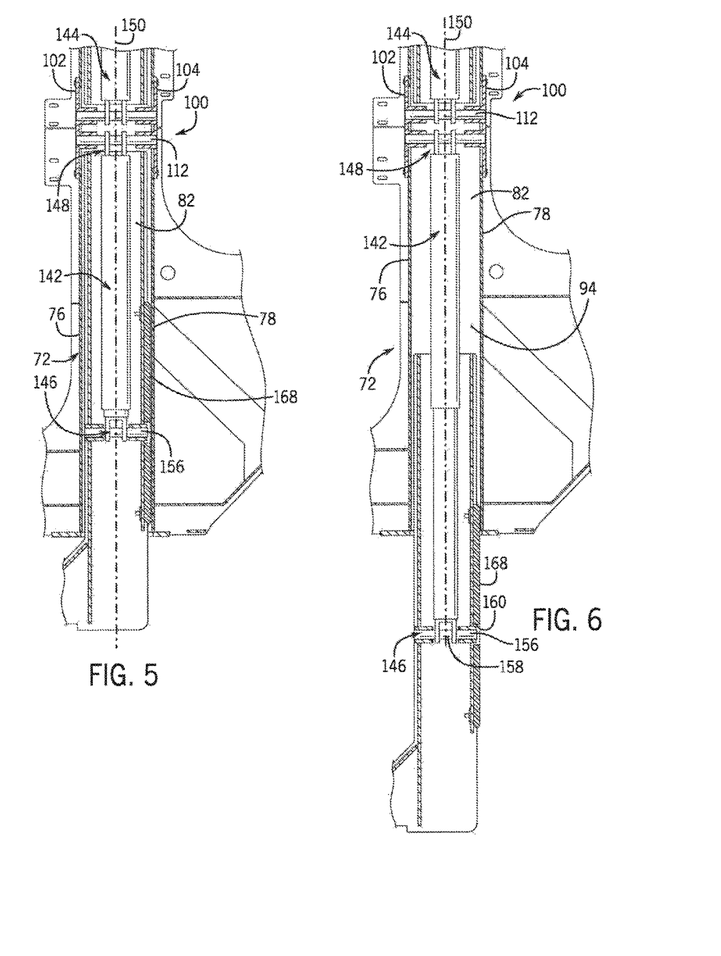
FIG. 5 is a cross sectional side elevation view of the frame in the first position, taken generally along line 5-5 of FIG. 3 showing the interior of a cross member.
FIG. 6 is a cross sectional side elevation view of the frame in the second position, taken generally along line 6-6 of FIG. 4 showing the interior of the cross member.

To facilitate movement of the first axle slider 114 and the second axle slider 116, a plurality of actuators may be mounted within the first cross member 72 and the second cross member 74. While FIGS. 5-7 show a pair of actuators 142, 144 contained within the second cross member 72, it should be noted that an identical pair of actuators are also located within the first cross member 72 as will be described below. As shown, the plurality of actuators 142, 144 are substantially cylindrical actuators, where each cylindrical actuator 142, 144 includes a first end 146 and second end 148. Four actuators may be utilized that attach to the chassis frame 14 and one of the axle slider legs 118, 120, 122, 124. A first actuator may be mounted within the first cross member 72 at one end and to the first slider leg 118 at the other end and a third actuator 142 may be mounted within the second cross member 74 at the first end 146 and to the second slider leg 120 at the second end 148. As such, the first actuator and third actuator 142 may form a first side actuator pair for moving the first axle slider assembly 114 into or out of the chassis frame 14. Additionally, a second actuator may be mounted within the first cross member 72 at one end and to the third slider leg 122 at the other end and a fourth actuator 144 may be mounted within the second cross member 74 at one end 146 and to the fourth slider leg 124 at the other end 148. As such, the second actuator and fourth actuator 144 may form a second side actuator pair for moving the second axle slider assembly 116 into or out of the chassis frame 14.

It should also be noted that the actuators 142, 144 are preferably mounted such that each actuator 142, 144 is located substantially close to the center axis 150 of the cross member 72, 74, midway between the front wall 76 and the rear wall 78, and midway between the top wall 80 and the bottom wall 82. For instance, the first and second actuators may both run substantially parallel through a central axis extending through the first cross member 72. Stated differently, the first and second actuators may be substantially concentrically mounted within the first cross member 72. Similarly, the third and fourth actuators 142, 144 may also both run substantially parallel through a central axis 150 extending through the second cross member 74, as shown in FIGS. 5 and 6. The third and fourth actuators 142, 144 also may be substantially concentrically mounted within the second cross member 74. This is advantageous over similar systems found in the prior art where actuators were used but were not concentrically mounted within the respective cross member. More specifically, the concentric location of the actuators 142, 144 within the cross member 74 reduces the bending moment on the actuators 142, 144, as well as stress due to flex that is caused by having the actuators 142, 144 mounted away from the central axis of the cross member 74. Due to these reduced stresses and bending moments, the actuators 142, 144 can be smaller in size, which reduces the cost of the actuators 142, 144 as well as the amount of hydraulic fluid required for the actuators 142, 144 to function. Furthermore, the smaller sized actuators 142, 144 are easier to package and ship.

The plurality of actuators 142, 144 may be mounted on one end to the chassis frame 14 about the mounting plates 102, 104, as can best be seen in FIG. 7. More specifically, the pins 112 may be inserted through the first mounting plate 102, through openings 152 located in a yoke 154 of the actuator 142, 144 at the second end 148, and then through the second mounting plate 104. Therefore, the mounting plates 102, 104 and pins 112 mount the inner end of the actuator 142, 144 in place. Additionally, once the mounting plates 102, 104 are mounted to the chassis frame 14, the interior of the cross members 72, 74 may be isolated from the exterior of the cross member 72, 74. This helps to protect components within the cross members 72, 74, including the actuators 142, 144, from substances that are distributed from the sprayer 10, including chemicals, pesticides, and other liquids that could damage or reduce the efficiency of interior components, such as the actuators 142, 144. Additionally, when the mounting plates 102, 104 are removed in the unmounted position, the second end 148 of the actuators 142, 144 can be easily accessed for maintenance purposes.

Figure 10:
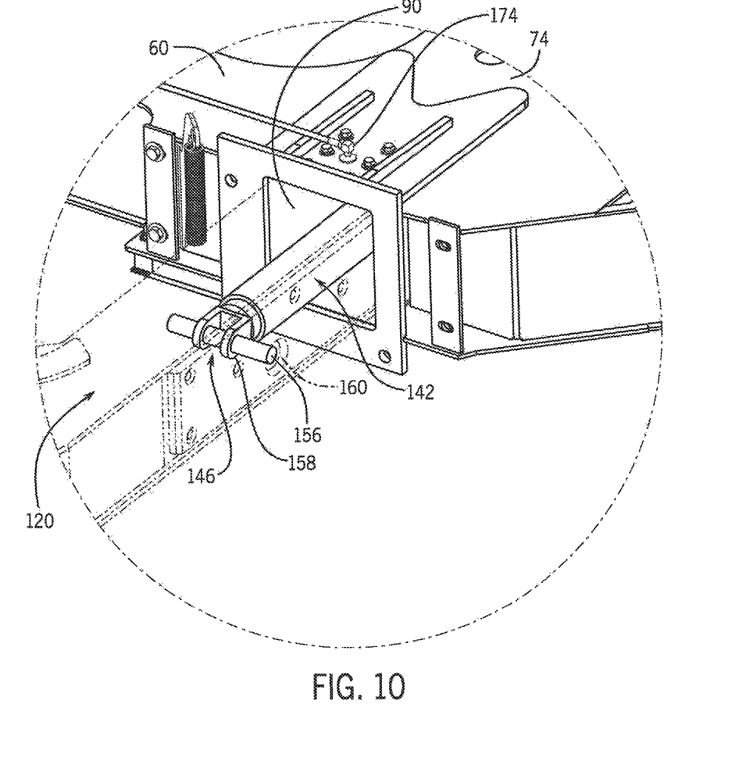
FIG. 10 is a detailed isometric view of the axle slider in phantom and a portion of the chassis frame showing the interior of the axle slider.

On the first end 146, the actuators 142, 144 are secured to the axle slider leg 118, 120, 122, 124, with one of the four actuators associated with one of the four axle slider legs. While FIG. 10 shows the connection between the third actuator 142 and the second axle slider leg 120, it should be noted that the other actuators could similarly be mounted to the other axle slider legs. Still looking to FIG. 10, the third actuator 142 may be secured within the second axle slider leg 120 with at least one pin 156 extending through an opening 158 formed in the first end 146 of the actuator 142 and an opening 160 formed in the second axle slider leg 120. As a result, when the actuators 142, 144 are actuated, the axle slider legs 118, 120, 122, 124 can be telescopically moved into or out of the respective cross member 72, 74. In turn, this results in telescopic movement of the first axle slider 114 and the second axle slider 116 into and out of the first cross member 72 and second cross member 74, which causes the overall width of the sprayer 10 to change. The overall width of the sprayer 10, and by extension the distance between the wheels 22 of the sprayer 10, can therefore be adjusted as desired. As seen in FIG. 3, the sprayer 10 is shown in a first minimum width W. The sprayer 10 can be expanded to a second maximum width W', as seen in FIG. 4. Of course, the sprayer 10 width could be adjusted to any width between width W and width W'. Further still, the sprayer 10 could be further extended beyond width W' in other embodiments. Again, preferably the actuators 142, 144 are synched such that they move an equal distance to ensure that the center of the sprayer 10 remains along the longitudinal axis.

Another aspect of the sprayer 10 relates to a slider to frame connection arrangement 162 that allows for movement between the pair of left slider receivers 86, 90 and the first axle slider 114 and the pair of right slider receivers 88, 92 and the second axle slider 116. This could be used for a sprayer 10 that is shipped with the chassis frame 14 separate from the axle sliders 114, 116, or where the sprayer 10 features a tread width adjustment feature. The frame connection arrangement 162 may include a reduced friction zone 164 that is defined at outer ends of the pair of left slider receivers 86, 90 and the pair of right slider receivers 88, 92. The reduced friction zone 164 helps facilitate the telescopic movement of the respective pairs of slider legs 118, 120, 122, 124 into and out of the pair of left slider receivers 86, 90 and the pair of right slider receivers 88, 92 described above while minimizing friction between the various components. For instance, a fixed slider wear pad 166 may be arranged in a fixed position within the reduced friction zone 164. Additionally, or in substitution to the fixed slider wear pad 166, a movable slider wear pad 168 may be movably arranged in the reduced friction zone 164. The movable slider wear pad 168 moves within the reduced friction zone 164 when the telescopic movement of the respective pairs of slider legs 118, 120, 122, 124 into and out of the pair of left slider receivers 86, 90 and the pair of right slider receivers 88, 92 described above.

The slider wear pads 166, 168 could be made of any material known to reduce friction between metallic components. For instance, the slider wear pads 166, 168 may be made of a material having an ultra-high molecular weight. Such materials may be made from recycled material. Each of the wear pads 166, 168 may be secured into place relative to the axle slider legs 118, 120, 122, 124 and/or slider receivers 86, 88, 90, 92 using bolts, screws, or other fasteners. Of course, multiple fixed slider wear pads 166 and multiple movable slider wear pads 168 could be used to further facilitate movement of the axle slider legs 118, 120, 122, 124 relative to the slider receivers 86, 88, 90, 92.

More specific configurations of slider wear pads 166, 168 will now be described. Although these slider wear pads 166, 168 will be described relative to the first axle slider assembly 114, it should be noted that similar configurations could be used with the second axle slider assembly 116 of the sprayer 10. Turning to FIG. 11, a pair of fixed slider wear pads 166a, 166b, may be associated with each slider receiver. As shown in the figures, the fixed slider wear pads 166a, 166b are mounted to opposite inwardly-facing surfaces of the slider receiver walls. More specifically, a first fixed slider wear pad 166a is mounted to the top wall 80 and a second fixed slider wear pad 166b is mounted to a bottom wall 82. Therefore, in this configuration the fixed slider wear pads 166a, 166b are all horizontally oriented. This would reduce friction between any of the top wall 80 and the bottom wall 82 of the second axle slider leg 120 as it is inserted into the third slider receiver 90. However, the fixed slider wear pads 166 could also be mounted to one or both of the front wall 76 and the rear wall 78, either in combination with the pair of pads 166a, 166b mounted to the top wall 80 and the bottom wall 82 or in isolation. Again, while only the third slider receiver 90 is shown, similar fixed slider pads 166 or pairs of fixed slider pads can be mounted within the first slider receiver 86, the second slider receiver 88, and the fourth slider receiver 92.

Figure 9:
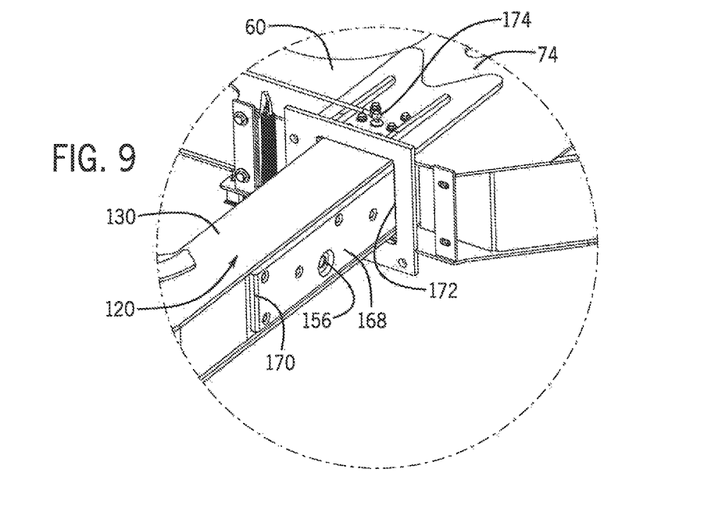
FIG. 9 is a detailed isometric view of the axle slider and a portion of the chassis frame in the second position of FIGS. 4 and 6.

Turning to FIGS. 9 and 10, a single movable wear pad 168 is associated with each axle slider leg 118, 120, 122, 124, with a pair of movable wear pads associated with an entire axle slider 114, 116. More specifically, the movable wear pad 168 is mounted to a rearward-facing wall 128 of the second axle slider leg 120. For instance, the movable wear pad 168 may be mounted in the lip 134 formed by the offset of the front or rear wall 126, 128 and the top and bottom wall 130, 132 described above. The movable wear pad 168 therefor extends beyond the lip 134 to provide a wear pad surface that engages the rear wall 78 of the slider receiver 90. Another movable wear pad (not shown) is mounted to a forward-facing wall 126 of the first axle slider leg 118 associated with the first axle slider assembly 114. In this way, the movable wear pads 168 are vertically oriented. As such, this pair of movable wear pads 168 move in unison with respective first and second axle slider legs 118, 120. As stated above, additional movable wear pads 168 could also be mounted to any of the axle slider legs 118, 120, 122, 124, for instance on the opposite side of the axle slider legs 118, 120, 122, 124. Again, while only the third slider receiver 90 is shown, similar movable slider pads 168 or pairs of movable slider pads can be mounted about the first axle slider leg 118, the third axle slider leg 122, and the fourth axle slider leg 124.

Preferably, the configuration of fixed slider wear pads 166 and movable slider wear pads 168 reduces friction about multiple walls of the axle slider legs 118, 120, 122, 124 and the slider receivers 86, 88, 90, 92. For instance, as shown the slider-to-frame connection 162 protects top and bottom walls 80, 82, 130, 132 by the fixed wear pads 166, and protects front and rear walls 76, 78, 126, 128 using the movable wear pads 168. Additionally, as can be seen in the figures, the movable wear pads 168 may have a surface area greater than the surface area of the fixed wear pad 166. The additional surface area of the movable wear pad 168 accounts for the fact that the axle slider legs 118, 120, 122, 124 will be moving in and out of the slider receivers 86, 88, 90, 92. Therefore, the increased length of the movable wear pad 168 may reflect the travel path and length of the axle slider legs 118, 120, 122, 124 that move into and out of the slider receivers 86, 88, 90, 92. Stated differently, each movable wear pad 168 may have a first end 170 and a second end 172, where the first end 170 is substantially flush with the edge of the frame side rail 60 when the machine 10 is at its narrowest width, as seen for instance in FIG. 3. The second end 172 would be substantially flush with the edge of the frame side rail 60 when the machine 10 is at its widest width, as seen for instance in FIG. 4. In the way, when the sprayer 10 is at any operative width, the movable wear pad will be at least partially engaged between the axle slider legs 118, 120, 122, 124 and the slider receivers 86, 88, 90, 92.

Additionally, where the sprayer 10 features the tread width adjustment feature, each of the slider receivers 86, 88, 90, 92 may include grease fittings configured to allow for insertion of grease into the slider receivers 86, 88, 90, 92 to further reduce the amount of friction between the various components including the slider receivers 86, 88, 90, 92 and the respective axle slider legs 118, 120, 122, 124. For instance, a first grease fitting 174 may be formed in the top wall 80 of the cross members 72, 74 and a second grease fitting (not shown) may be formed in a bottom wall 82 of the cross member 72, 74. Looking to FIG. 9, although the top grease fitting 174 is only shown relative to the third slider receiver 90, similar grease fittings are used with the remaining slider receivers 86, 88, 92. Where the sprayer 10 does not feature the tread width adjustment feature, grease fittings need not be included, but nevertheless the slider to frame connection 162 may facilitate the installation of the first axle slider assembly 114 relative to the first side 50 about the first slider receiver 86 and the third slider receiver 90 and the second axle slider assembly 116 relative to the second side 52 about the second slider receiver 88 and the fourth slider receiver 92.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A high clearance sprayer with adjustable tread width comprising:
    a frame comprising a first side, a second side, a first cross member extending from the first side to the second side to form a first slider receiver on the first side and a second slider receiver on the second side, and a second cross member extending from the first side to the second side to form a third slider receiver on the first side and a fourth slider receiver on the second side;
    a first axle slider comprising:
        a first axle slider leg configured to be telescopically inserted into the first slider receiver;
        a second axle slider leg configured to be telescopically inserted into the third slider receiver;
        a main slider body that extends parallel to the first side of the frame from the first axle slider leg to the second axle slider leg;
        a pair of swingarms extending from a front and rear segment of the main slider body;
        a pair of wheels rotatably supported by the pair of swing arms;
    a second axle slider comprising:
        a third axle slider leg configured to be telescopically inserted into the second slider receiver;
        a fourth axle slider leg configured to be telescopically inserted into the fourth slider receiver;
        a main slider body that extends parallel to the second side of the frame from the third axle slider leg to the fourth axle slider leg;
        a pair of swingarms extending from a front and rear segment of the main slider body;
        a pair of wheels rotatably supported by the pair of swingarms;
    a plurality of actuators mounted within the first cross member and the second cross member;
    wherein:
        each of the plurality of actuators is secured to the frame and a corresponding one of the first axle slider leg, the second axle slider leg, the third axle slider leg, and the fourth axle slider leg; and
        a first portion of the plurality of actuators telescopically moves the first axle slider into and out of the first and second cross members and a second portion of the plurality of actuators telescopically moves the second axle slider into and out of the first and second cross members to adjust the width of the tread.

2. The high clearance sprayer with adjustable tread width of claim 1, wherein each of the plurality of actuators is mounted to an interior of the corresponding one of the first axle slider leg, the second axle slider leg, the third axle slider leg, and the fourth axle slider leg.

3. The high clearance sprayer with adjustable tread width of claim 1, further comprising:
    a first opening formed in a front wall of the first cross member;
    a second opening formed in a rear wall of the first cross member;
    a third opening formed in a front wall of the second cross member; and
    a fourth opening formed in a rear wall of the second cross member.

4. The high clearance sprayer with adjustable tread width of claim 3, further comprising a tread width connection assembly, the tread width connection assembly including:
    a first mounting plate that is mounted to the front wall of the first cross member to cover the first opening;
    a second mounting plate that is mounted to the rear wall of the first cross member to cover the second opening; and
    a plurality of pins extending through the first mounting plate, the second mounting plate, and a plurality of mounting openings formed in the actuators.

5. The high clearance sprayer with adjustable tread width of claim 4, further comprising:
    a third mounting plate that is mounted to the front wall of the second cross member to cover the third opening;
    a fourth mounting plate that is mounted to the rear wall of the second cross member to cover the fourth opening; and
    a plurality of pins extending through the third mounting plate, the fourth mounting plate, and mounting openings formed in the actuators.

6. The high clearance sprayer with adjustable tread width of claim 5, wherein the first mounting plate further comprises a first collar extending therefrom;
    wherein the first collar locates the first mounting plate relative to the first opening;
    wherein the second mounting plate further comprises a second collar extending therefrom;
    wherein the second collar locates the second mounting plate relative to the second opening;
    wherein the third mounting plate further comprises a third collar extending therefrom;
    wherein the third collar locates the third mounting plate relative to the third opening;
    wherein the fourth mounting plate further comprises a fourth collar extending therefrom; and
    wherein the fourth collar locates the fourth mounting plate relative to the fourth opening.

7. The high clearance sprayer with adjustable tread width of claim 1, wherein the first cross member and the second cross member are substantially hollow.

8. The high clearance sprayer with adjustable tread width of claim 1, wherein each of the plurality of actuators extend or retract the same distance when actuated.

9. A high clearance sprayer with adjustable tread width comprising:

a frame with a first cross member and a second cross member;
a first axle slider comprising:
  a first axle slider leg configured to be telescopically inserted into the first cross member;
  a second axle slider leg configured to be telescopically inserted into the second cross member;
  a main slider body that extends from the first axle slider leg to the second axle slider leg;
a second axle slider comprising:
  a third axle slider leg configured to be telescopically inserted into the first cross member;
  a fourth axle slider leg configured to be telescopically inserted into the second cross member;
  a main slider body that extends from the third axle slider leg to the fourth axle slider leg; and
a plurality of actuators, each of the plurality of actuators having a first end within one of the first cross member and the second cross member and a second end within a corresponding one of the first axle slider leg, the second axle slider leg, the third axle slider leg, and the fourth axle slider leg;
wherein:
  each of the plurality of actuators is secured to the frame and to the corresponding one of the first axle slider leg, the second axle slider leg, the third axle slider leg, and the fourth axle slider leg; and
  a first portion of the plurality of actuators telescopically moves the first axle slider into and out of the first cross member and the second cross member and a second portion of the plurality of actuators telescopically moves the second axle slider into and out of the first cross member and the second cross member to adjust the width of the tread.

10. The high clearance sprayer with adjustable tread width of claim 9, wherein the first axle slider further comprises:
  a pair of swingarms extending in opposite directions from the main slider body; and
  a pair of wheels rotatably supported by the pair of swing arms.

11. The high clearance sprayer with adjustable tread width of claim 9, further comprising:
  a first opening formed in a front wall of the first cross member;
  a second opening formed in a rear wall of the first cross member;
  a third opening formed in a front wall of the second cross member; and
  a fourth opening formed in a rear wall of the second cross member.

12. The high clearance sprayer with adjustable tread width of claim 11, further comprising a tread width connection assembly, the tread width connection assembly including:
  a first mounting plate that is mounted to the front wall of the first cross member to cover the first opening;
  a second mounting plate that is mounted to the rear wall of the first cross member to cover the second opening;
  a plurality of pins extending through the first mounting plate, the second mounting plate, and a plurality of mounting openings formed in the actuators.

13. The high clearance sprayer with adjustable tread width of claim 12, wherein the first mounting plate further comprises a first collar extending therefrom;
  wherein the first collar locates the first mounting plate relative to the first opening;
  wherein the second mounting plate further comprises a second collar extending therefrom; and
  wherein the second collar locates the second mounting plate relative to the second opening.

14. The high clearance sprayer with adjustable tread width of claim 13, wherein each of the first mounting plate and the second mounting plate define:
  a mounted position in which one of the first mounting plate and the second mounting plate is connected to the respective frame cross member and covers the opening in the frame cross member and prevents access to the actuators within the frame cross member, and
  an unmounted position in which the one of the first mounting plate and the second mounting plate is removed from the respective frame cross member so that the opening in the frame cross member is uncovered and allows access to the actuators within the frame cross member.

15. The high clearance sprayer with adjustable tread width of claim 14, wherein the plurality of pins are inserted through the first collar, the second collar, and the plurality of mounting openings formed in the actuators when the first mounting plate and the second mounting plate are in the mounted position.

16. The high clearance sprayer with adjustable tread width of claim 9, wherein each of the plurality of actuators extend or retract the same distance when actuated.

17. A high clearance sprayer with adjustable tread width comprising:
  a chassis having
  a frame with left and right rails at left and right sides of the frame and a pair of frame cross members that extends between the left and right frame side rails, wherein
    a pair of left slider receivers are defined by left segments of the cross members and each of the left slider receivers has an outer end with an opening that connects to a slider passage that extends longitudinally through the respective slider receiver;
    a pair of right slider receivers are defined by right segments of the cross members and each of the right slider receivers has an outer end with an opening that connects to a slider passage that extends longitudinally through the respective slider receiver,
  a left axle slider configured to support a pair of left wheels, wherein the left axle slider includes:
    a main slider body that extends parallel to the left frame rail, and
    a pair of slider legs that extend from first and second ends of the main slider body toward the frame, with the slider legs of the left axle slider telescopically housed in the pair of left slider receivers;
  a right axle slider configured to support a pair of right wheels, wherein the right axle slider includes:
    a main slider body that extends parallel to the right frame rail, and
    a pair of slider legs that extend from first and second ends of the main slider body toward the frame, with the slider legs of the right axle slider telescopically housed in the pair of right slider receivers;
  actuators arranged within the left and right slider receivers for pushing and pulling the slider legs within the respective slider receivers to telescopically adjust the tread width of the high clearance sprayer; and
  tread width connection assemblies configured to connect the actuators to the frame, with each of the tread width connection assemblies including,
    at least one mounting plate removably covering an opening in each of the frame cross members between the respective left and right slider receivers, wherein each of the at least one mounting plate defines, a mounted position in which a corresponding one of the at least one mounting plate is connected to the respective frame cross member and covers the opening in the frame cross member and prevents access to the actuators within the frame cross member, and an unmounted position in which the corresponding one of the at least one mounting plate is removed from the respective frame cross member so that the opening in the frame cross member is uncovered and allows access to the actuators within the frame cross member.

18. The high clearance sprayer of claim 17, further comprising a pair of pins that extends through the cross member and mounts inner ends of the respective actuators within the cross member.

19. The high clearance sprayer of claim 18, wherein ends of the pins are connected to the corresponding one of the at least one mounting plate when the corresponding one of the at least one mounting plate is in the mounted position.

20. The high clearance sprayer with adjustable tread width of claim 17, wherein each of the actuators extend or retract the same distance when actuated.

\* \* \* \* \*